Patented Oct. 3, 1950

2,524,046

UNITED STATES PATENT OFFICE 2,524,046

MULTICHAIN POLYAMIDE POLYMERS

Paul J. Flory, Kent, Ohio, assignor to Wingfoot Corporation, Akron, Ohio, a corporation of Delaware No Drawing. Application June 5, 1946, Serial No. 674,656

16 Claims. (Cl. 260—78)

This invention relates to condensation polymers which are non-linear but which are capable of being drawn into fibers, molded or otherwise formed. More particularly, the invention relates to polyamides made by condensing amino acids, or derivatives thereof, with polycarboxylic acids having six or more carboxylic acid groups, or derivatives thereof.

Condensation polymers, both the polyesters and polyamides, have been known to the art for many years. More recently, the field has been systematically investigated and developed by W. H. Carothers and many patents have issued to him and his co-workers. Much of this work has been published in various patent specifications, and in "Collected Papers of W. H. Carothers," Interscience Publishers Inc., New York (1940). The prior art recognizes a critical distinction between two types of condensation polymers. When the compounds being condensed are bifunctional, that is, when each of the condensing molecules has only two reactive groups, the condensation must be linear. Thus, a monoamino-monocarboxylic acid can only condense to form polymers of the general type:

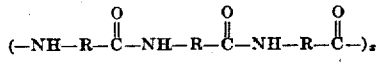

Similarly, diamines and dicarboxylic acids can only form linear polymers of the general type:

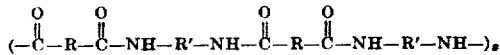

The symbols R and R' in the foregoing formulae may be any organic divalent radicals, preferably hydrocarbon radicals.

It has long been recognized that the introduction of polyfunctional units having three or more functions causes a network structure of the linear molecules and the resulting polymer will gel and lose its desirable thermoplastic properties. Such non-linear polymers are generally insoluble and infusible, apparently owing to the network structures which occur therein. The linear polymers, on the other hand, are thermoplastic because the long linear chains are not inter-connected by branched linkages. Similarly, it is well known that variation can be brought about by the incorporation of a polyfunctional reactant having more than two reactive groups with a mixture of other reactants which normally produce thermoplastic linear polymers. The replacement of a remarkably small percentage of one or the other of the bifunctional reactants by said polyfunctional reactant is known to cause the formation of thermoset, or gelled, products in place of the thermoplastic polymers which would otherwise be formed. For example, even one-half hole percent of a reactive tetrabasic acid when added to an equimolar mixture of decamethylene diamine and sebacic acid induces gelation during the polymerization. The product which otherwise would have been thermoplastic is thermoset and unsuitable for extrusion molding, solution casting and any other conventional plastic fabrication method. Usually such gelation takes place before a desirable molecular weight is achieved, and the compound so obtained is not capable of conventional usage.

Similarly, the use of other polyfunctional compounds having more than two reactive groups will form gelled thermoset polymers. The polymers formed similarly from triamino compounds, trihydroxy compounds and the other amino and hydroxy compounds having more than three functions are also non-thermoplastic and not capable of being used in any manner described by the art for linear polymer fabrication.

The prior art, as exemplified by Carothers' work, relates entirely to the linear type of condensation polymer. This is unequivocally stated in the basic patents issued to Carothers (U. S. 2,071,250 and U. S. 2,071,251). These patents further teach that only bifunctional compounds can be used to prepare linear polymers and that the use of polyfunctional compounds having more than two reactive groups will produce undesirable polymers.

Despite this teaching, it has now been found possible to synthesize non-linear polymers which are thermoplastic and capable of being formed into strong useful fibers. A further purpose of this invention is to provide a method of preparing thermoplastic macromolecular polymers wherein, by proper selection and proportioning of reagents, the formation of gelled or non-thermoplastic polymers is avoided. Still further purposes of the invention are to provide simple and convenient methods of preparing new and valuable condensation polymers.

In accordance with this invention it has been found that polyamides of non-linear character may be prepared which are useful in the preparation of fibers and in various molding and forming operations, contrary to the expectations and teachings of the prior art. The new polyamides are prepared from polybasic acids having six or more carboxylic acids groups, or derivatives thereof, such as esters, amides, acid chlorides, or anhydrides by condensation with amino acids having only one amino group and one carboxylic group, or derivatives of the same amino acids, such as esters, amides or lactams. While the new polymers are non-linear because of the use of reagents of functionality greater than two, they nevertheless do not possess a network structure. The new polymers may be represented by the formula:

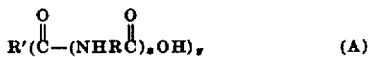

wherein R' is the radical, or nucleus, of the polybasic acid having six or more carboxylic acid groups and to which the carboxyl radicals are attached, R is the radical of the amino acid, $x$ represents the average number of amino acid groups in the condensed chains, and $y$ represents the number of chains per R' nucleus.

The above structural formula (A) will apply when the carboxyl groups in the nucleus R' are spaced relatively distant from each other, that is, when the carboxyl groups are attached to carbon atoms which are separated in a chain by two or more other atoms. If the carboxyl groups are attached to adjacent carbon atoms or carbon atoms separated by a single atom, a side chain may be attached to the nucleus by an imide linkage such as

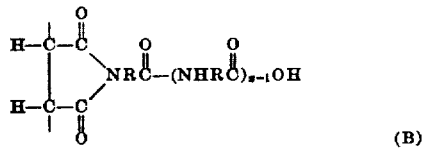

or

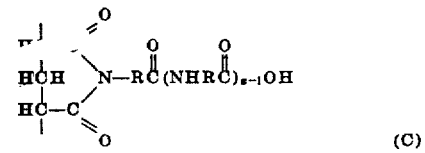

Both imide linkages, as shown by the structural formulae (B) and (C), and the amide linkages (A) may possibly be found in all polyamide condensation polymers in which long polyamide chains extend from a polybasic acid nucleus.

The new amide condensation polymers may be regarded as multi-chain polymers in which long polyamide polymer chains extend from a nucleus containing six or more carboxylic groups. For example, the hexabasic acid, made by condensing acrylonitrile with cyclopentadiene and subsequently hydrolyzing the resulting product, will condense with an amino acid of the type

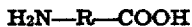

to form polymers which may be represented by structural formula as follows:

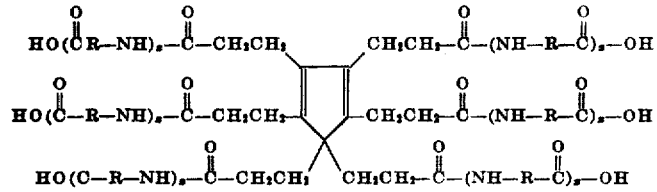

wherein $x$ is the average number of amino acid molecules condensed in the side chains.

The new condensation polymers are macromolecular multi-chain structures in which the number of carboxylic acid groups in the nucleus and the number of linear side chains may be six or more, and preferably from six to twelve inclusive. The number of amino acid molecules condensed in the side chains will average between 10 and 1000 and will preferably be between 30 and 200. The polyacid which forms the nucleus of the polymer may be any monomeric polycarboxylic acid having six or more carboxylic acid groups, such as mallitic acid, otherwise known as benzene hexacarboxylic acid, 1,1,2,3,4,5-hexa-(2'-carboxyethyl) cyclopentadiene, and any other known monomeric polycarboxylic acid or their esters, amides, acid chlorides or acid anhydrides, which have six or more acid functions.

Other monomeric polycarboxylic acids having six or more carboxylic acid groups may be synthesized for use in the preparation of polyamides. Such an acid is the 3,3,5,5,3',3',5',5' octa-(2-carboxyethyl)-4,4'-diketo-dicyclohexyl which may be prepared by the hydrogenation of p,p' dihydroxy-diphenyl to the corresponding dihydroxy-dicyclohexyl, subsequently dehydrogenating to remove four hydrogen atoms to form the corresponding diketones, reacting the diketone with eight molecular equivalents of acrylonitrile to form the octanitrile, and finally hydrolyzing the nitrile to the acid.

Accordingly, by the proper selection of a known monomeric polycarboxylic acid or a synthesized polycarboxylic acid a multi-chain polyamide having six or more side chains can be formed. Polyamides having six to twelve side chains per molecule are preferred.

In the preparation of the multi-chain polyamides the polycarboxylic acids or derivatives thereof are condensed with monoamino-monocarboxylic acids or mixtures thereof, or the corresponding esters, amides or lactams. The preferred compounds of this type are 6-aminocaproic acid, 10-aminodecanoic acid, 9-aminostearic acid, 12-aminostearic acid, 13-aminobehenic acid, 9-aminomargaric acid, 14-aminobehenic acid, 9-aminopalmitic acid, 13-aminostearic acid, 2-methyl-epsilon-caprolactam, p-(2-aminoethyl) benzoic acid and other known monocarboxylic acids and derivatives having a single amino function and more than four atoms between the amino and carboxyl groups.

Any amino acid which condenses predominantly intermolecularly, rather than intramolecularly, may be used. In general, amino acids having more than four carbon or other atoms separating the $NH_2$ and $COOH$ groups undergo intermolecular condensation in preference to cyclization.

It will be noticed that the number of chains per molecule and the number of amino-acid groups per chain may be varied from relatively small numbers to very large values. Generally where the number of chains present is relatively small, the chains are preferably of greater length, and where the chain length is quite short the preferred compounds will have a relatively large number of the side chains. Similarly, useful polyamides may be prepared with a moderate number of chains of intermediate length. Short chain polyamides and those having few chains may be too low in molecular weight to be useful in drawing fibers, but such polyamides may be useful as coating compositions or adhesives or in the preparation of molded objects. The higher molecular weight compositions are frequently crystalline in nature and can be drawn into strong elastic fibers. They are also useful in the preparation of coating compositions and in the molded products field. In general, the polyamides condensed from a single amino acid, or derivative thereof, are more useful in the preparation of fiber-forming polymers capable of being cold drawn, while the polymers of a plurality of different amino acids, or derivatives thereof, are particularly valuable as coating compositions and in the fabrication of molded products.

Although the number of side chains is determined by the selection of the polycarboxylic acid the number of aminoacid nuclei in each chain will be determined by the relative number of polycarboxylic acid and aminoacid molecules condensed. There will be generally between 100 and 5000 molecules of aminoacid for each molecule of polycarboxylic acid and in the preferred preparations these ratios are between 250 and 2500. The number of molecules of amino acid per available carboxylic acid radical will, in general, be between 20 and 1,000, whereas the more desirable compositions will have between 30 and 200 molecules of amino acid per available carboxylic acid radical.

The new multi-chain polyamides generally are prepared by heating an amino acid, or suitable derivative thereof, with a polycarboxylic acid at temperatures above the melting point of the mixture. In some cases where a diluent is used, the temperature may be below the melting point of the reactants and of the polyamide, but above the melting point of the reaction mass including the diluent. Temperatures between 150° C. and 275° C. are usually required to produce a desirable polymer. In the preparation of multi-chain condensation polymers it is customary to carry the condensation reaction as nearly to completion as is practical. In many cases it is desirable to employ a lower temperature initially, such that the reaction proceeds at a moderate rate, the temperature being raised at a later stage to facilitate substantial completion of the condensation. In some instances the temperature may be gradually increased throughout the reaction, or increased intermittently so as to operate at three or more different temperatures. The condensation reaction usually is completed at temperatures in the vicinity of 250° C. In some cases, as for example where the melting point is unusually high, it may be necessary to operate at higher temperatures in order to maintain the polymerizing mixture in molten condition. If the melting temperature approaches the decomposition temperature, usually in the vicinity of 300° C., it often is desirable to reduce the melting point by employing an inert diluent such as a high boiling phenolic compound.

At the high temperatures employed, for example over 200° C., the polymerizing mixture is susceptible to oxidation by air, or even traces of oxygen. Oxidation causes darkening and degradation of the polymer. Accordingly, it is important to exclude oxygen from the reaction vessel. This is accomplished by sweeping out the vessel with nitrogen, or other inert gas, prior to initiation of the reaction and maintaining the oxygen-free atmosphere by passing a continuous stream of the inert gas through the reaction chamber during the polymerization. The stream of inert gas further assists in removing traces of water vapor, alcohols, or other by-products formed by the reaction, depending upon the particular derivatives selected for the preparation. Although any inert gas, such as helium and argon, may be used, for reasons of economy nitrogen is preferred. Ordinary commercial nitrogen, however, is not useful because it contains traces of oxygen which interfere with normal operation. Accordingly, it is necessary to purify the nitrogen by the removal of all traces of oxygen.

The progress of the polymerization can be conveniently followed by periodically determining the viscosity of the molten mass in situ, and at the temperature of polymerization. As already mentioned, it is desirable in the preparation of multi-chain polymers to carry the reaction very nearly to completion. Accordingly, further heating is discontinued when the condensation has reached substantial completion as judged by the tendency of the melt viscosity to approach an asymptotic upper limit, that is, when successive viscosity measurements, separated by an interval of 15 minutes to an hour, show no large increase in viscosity. There is a definite relationship between the viscosity of the molten mass and the molecular weight of the polyester, the molecular weights being usually in excess of 10,000 and frequently in excess of 40,000.

Usually, but depending somewhat on the nature of the particular reactants, it is preferred to subject the hot reaction mixture to reduced pressure during a portion, at least, of the later stages of the polymerization. In this manner low molecular weight, somewhat volatile, by-products of the condensation as well as unreacted monomers, such as the lactams, may be largely removed. Pressures between 10 and 100 mm. of mercury are preferred for this purpose. A stream of inert gas, such as oxygen-free nitrogen, may be passed through the reaction mass while it is under reduced pressure to facilitate removal of volatile materials. The completed polymers may be drawn immediately into filaments or they may be cooled and ground to convenient size for storage. The molten polymer may be cooled by quenching in water and the resultant product ground to desired size and dried.

The specific polymerization procedure employed will be governed largely by the particular reactants in a given case. A few further generalizations may be mentioned. If an amino acid or its ester or amide is to be polymerized with the polybasic acid, the reactants may be heated together at atmospheric pressure, in the absence of oxygen, under conditions permitting removal of the by-product, water, alcohol, or ammonia. If, on the other hand, a lactam of the amino acid is to be employed, it may be necessary to subject the reactants to a preliminary heating above their melting points, and usually in the neighborhood of 180 to 225° C., in a closed system. In such cases it is customary to add a small proportion of water to the ingredients for the purpose of assuring intramolecular reaction of the lactam. After the preliminary heating period, usually for 2 to 4 hours, the reaction system is opened and the polymerization is completed at atmospheric or lower pressures as described above. Alternatively, the pressure developed by the water may be released gradually by bleeding off the water slowly.

Similarly, if a polynitrile of the polybasic acid or the corresponding ester is employed, rather than the acid itself, it is preferred to conduct the initial phase of the polymerization in a closed system under the pressure of water which is added initially or which may be formed by condensation.

In the preparation of high molecular weight polyamides it is frequently desirable to reduce the viscosity of the polymers during the condensation reaction by adding plasticizers. These plasticizers are high-boiling compounds which are liquids at the condensation temperatures and solvents for the polyamides. Such compounds reduce the viscosity of the polymers and permit the use of higher temperatures than would otherwise be possible. Accordingly, by adding the plasticizers, higher molecular weights are reached and polyamides useful in fiber drawing are prepared which otherwise would not be capable of such use. Suitable plasticizers are p-hydroxydiphenyl, xylenol, and o-hydroxydiphenyl.

The new multi-chain polymers may be drawn into filaments by extruding the molten polymer through dies or orifices of suitable size, whereby continuous fibers are produced by the congealing of the polymers. Similar filaments may be prepared by the preparation of solutions of the polymer in any suitable solvent, such as an alcohol, a phenol, a glycol, a chlorohydrin, formic acid or sulfuric acid, and extruding the solution through a die into a heated drying atmosphere or into a liquid which is miscible with the solvent but a non-solvent for the polymer. The latter wet processes for spinning produces filaments similar to the melt extrusion methods. By variation in the size and shape of the orifices, rods, sheets and other shaped polymers can be prepared. The polymers may be molded and otherwise shaped under heat and/or pressure. For example, the polymer may be rolled into thin sheets useful as wrapping material. Irregular shapes may be cast or pressed in suitable molds.

A principal property of the new polymers is their capacity for improved tensile strength achieved by cold drawing. If the fibers are elongated 100 to 500 percent at temperatures below their melting points, substantial improvement in tensile strength will be effected. Thin sheets may similarly be strengthened. The cold drawn fibers may be spun into thread or yarn of exceptional strength and woven into useful fabrics. Larger fibers may be used in the fabrication of brushes.

It should be understood that the new polyamides can be varied extensively in molecular structure, both by the selection of a polycarboxy compound having a desired number of carboxylic groups and by the proportioning of the amino acid with respect to the polycarboxylic compound. By this means the average length of the chains is controlled.

Further details of the preparation of the new polyamides are set forth with respect to the following specific examples.

*Example 1*

A mixture of 26.8 parts by weight of epsilon-caprolactam, 0.342 part of 3,3,5,5,3',3',5',5'-octa-(beta-carboxyethyl)4,4' diketodicyclohexyl and 0.8 part of water were placed in a glass reaction vessel. All air was flushed out of the vessel with a stream of pure argon, after which it was filled with argon and sealed. The reaction mass was heated by immersion in an oil bath at 150 to 160° C. for one hour to open the lactam ring and then for 16 hours at 185° C. The sealed glass container was then opened and vented through a cold condenser to a vacuum pump. A tube type of viscometer was introduced into the reaction vessel for the purpose of measuring the viscosity periodically during the subsequent reaction. The tube of the viscometer was used as a conduit for supplying a stream of argon to the flask for the purpose of sweeping out the reaction by-products and the unreacted caprolactam. The polymer was melted and the end of the viscometer tube immersed in the molten polymer. While bubbling a slow stream of argon through the polymer, the temperature was raised to 255° C. and maintained thereat for 80 minutes. A vacuum of from 20 to 40 mm. was then applied and maintained for 40 minutes. The viscosity was measured and the vacuum applied periodically as follows:

| Time, Minutes | Remarks | Viscosity, Poises |
|---|---|---|
| 0 | Heat reached 255° C | |
| 80 | Vacuum applied | |
| 120 | Vacuum off | |
| 160 | | 500 |
| 315 | Vacuum applied | 600 |
| 405 | Vacuum off | |
| 430 | Heat off | 1,090 |

During the evacuation 4.72 parts by weight of caprolactam were removed and condensed in a cold trap in the vacuum line. The polymer obtained was a hard, tough, tan-colored solid which melted to a clear amber-colored liquid. The filaments formed therefrom were readily cold-drawn to yield fibers of high strength.

*Example 2*

Using an apparatus similar to that described in Example 1 a mixture of 10.1 parts by weight of epsilon-caprolactam, 0.864 part of 3,3,5,5,3',3',-5',5'-octa-(beta-carboxyethyl)4,4' diketodicyclohexyl and 0.32 part of water were reacted in accordance with the following schedule:

| Time, Hours | Temperature | Remarks | Viscosity, Poises |
|---|---|---|---|
| | Degrees | | |
| 0 | 155 | Heat on | |
| 1 | 185 | | |
| 3½ | 202 | | |
| 4¾ | 255 | Vacuum on | |
| 10¾ | Heat off | Vacuum off | 4.9 |

While heated under reduced pressure 1.86 parts of unreacted epsilon-caprolactam was removed and condensed. The resulting polymer was a hard brittle solid which melted to form a clear amber liquid. The filaments prepared from the solid were hard and brittle.

*Example 3*

Using the procedure and apparatus described in Example 1, 24.8 parts by weight of epsilon-caprolactam, 1.063 parts by weight of the same octabasic acid, and 0.8 part by weight of water were heated for one hour at 150 to 160° C. The mixture was then heated for 6 hours and 45 minutes at 255° C. alternately at atmospheric pressure and at reduced pressures of 20 to 40 mm. During the reaction the viscosity was measured at intervals as follows:

| Time in Hours and Minutes at 255° C. | Viscosity in Poises |
|---|---|
| 2-0 | 16.5 |
| 2-15 | 26.6 |
| 4-40 | 29.2 |
| 5-30 | 30.3 |
| 6-45 | 32.8 |

At 6 hours 45 minutes the viscosity became constant and no further increase was noted. The polymer was a hard brittle brown-colored solid which melted to form a clear brown liquid. The filaments formed from the solid polymer were capable of being cold drawn.

Example 4

Using the apparatus described in Example 1, a mixture of 0.158 part by weight of the octabasic acid used in the preceding examples, 15.01 parts of 2-methyl-6-ketohexamethyleneimine and 0.90 cc. of water were reacted in an argon atmosphere by heating at 184° C. for 2½ hours, at 202° C. for 3½ hours and at 218° C. for 8 hours. The resulting polymer was clear and colorless and remained clear when cooled to room temperature. The polymer was then heated for 7 hours at 255° C. and the viscosity increased from 6 to 374 poises. During this heating period the vacuum of 13 to 15 mm. of mercury was applied at intervals to move the uncombined reactants. The resulting polymer was a clear brittle amber resin which was soluble in ethyl alcohol.

Example 5

Using the apparatus described in Example 1 a mixture of 0.081 part by weight of the octabasic acid described in the preceding experiments and 7.94 parts of 10-aminodecanoic acid was reacted. The reaction mass was heated for 10 minutes at 184° C. and then at 202° C. at which the reactants quickly melted to a clear yellowish fluid which vigorously evolved water to form a polymeric substance. After one hour at atmospheric pressure and one-half hour at a pressure of 15 mm. the melt viscosity became 1730 poises. The polymer was then heated for an additional 1½ hours at 202° C. and for 15 minutes at 218° C. at atmospheric pressure and finally for 45 minutes at 218° C. and 15 mm. pressure. The melt viscosity at 218° C. increases to 4200 poises. The polymer was a tough opaque gray-colored solid melting at 185 to 186° C. It was easily drawn into filaments which were capable of cold drawing to yield fibers of good strength.

In the preceding examples the melt viscosities were determined by the method described in Journal of the American Chemical Society, vol. 62, p. 1057 (1940).

The multi-chain polymers herein described are polyamides prepared by the inter-reaction of polybasic acids containing six or more, and preferably 6 to 12, carboxylic acid groups or the corresponding esters, amides and nitriles with amino acids or the corresponding esters, amides and lactams. Other types of multi-chain polymers having very similar or identical properties may be prepared by the use of other reagents.

Polyamino compounds having more than two reactive amino groups may be reacted with monoamino monocarboxylic acids or derivatives thereof to form a wide variety of polymers which are non-linear in nature and yet do not form network structures. These are useful in the preparation of synthetic fibers.

Another type of multi-chain polymer may be prepared from polycarboxylic acids having more than two carboxylic acid radicals, or the derivatives of these polyacids, by inter-reaction with hydroxy acids, or the corresponding esters, and lactones.

Still other multi-chain polyamides may be prepared by reacting polyamino compounds having three or more active amino groups with mono- hydroxy monocarboxylic acids, or the corresponding esters, or lactones.

Still other multi-chain polymers may be prepared by reacting polyalcohols with three or more reactive hydroxyl groups, or the corresponding esters of said polyalcohols, with monohydroxy monocarboxylic acids or the corresponding esters and lactones.

The compounds described in the preceding five paragraphs are analogous to those described and claimed in this application and they are prepared by methods analogous to those described herein for the perparation of polyamides.

Although the invention has been described with respect to specific embodiments thereof, it is not intended that the details thereof shall be construed as limitations upon the scope of the invention except to the extent incorporated in the following claims.

I claim:

1. A method of preparing a polyamide condensation polymer which comprises condensing a compound of the group consisting of amino acids having a single reactive amino group and a single carboxylic acid group, said groups being separated by more than four atoms and said amino acids being free from other reactive substituents, and the corresponding esters, amides, and lactams of said amino acids, with a compound of the group consisting of monomeric polycarboxylic acids having from six to twelve carboxylic acid groups and being free from other reactive substituents, and the corresponding esters, amides, and acid chlorides of said polycarboxylic acids, said amino acids being present in the proportion of 100 to 5000 molecules of polycarboxylic acid.

2. A method of preparing a polyamide condensation polymer which comprises condensing a compound of the group consisting of amino acids having a single reactive amino group and a single carboxylic acid group, said groups being separated by more than four atoms and said amino acids being free from other reactive substituents, and the corresponding esters, amides, and lactams of said amino acids, with a compound of the group consisting of monomeric polycarboxylic acids having from six to twelve carboxylic acid groups and being free from other reactive substituents, and the corresponding esters, amides and acid chlorides of said polycarboxylic acids, said amino acids being present in the proportion of 250 to 2500 molecules for each molecule of polycarboxylic acid.

3. The polyamide condensation polymer prepared by condensing a compound of the group consisting of amino acids having a single reactive amino group and a single carboxylic acid group, said groups being separated by more than four atoms and said amino acids being free from other reactive substituents, and the corresponding esters, amides, and lactams of said amino acids, with a compound of the group consisting of monomeric polycarboxylic acids having from six to twelve carboxylic acid groups and being free from other reactive substituents, and the corresponding esters, amides, and acid chlorides of said polycarboxylic acids, said amino acids being present in the proportion of 100 to 5000 molecules for each molecule of polycarboxylic acid.

4. The polyamide condensation polymer prepared by condensing a compound of the group consisting of amino acids having a single reactive amino group and a single carboxylic acid group, said groups being separated by more than four atoms, and said amino acids being free from other reactive substituents, and the corresponding esters, amides, and lactams of said amino acids, with a compound of the group consisting of monomeric polycarboxylic acids having from six to twelve carboxylic acid groups and being free from other reactive substituents, and the corresponding esters, amides and acid chlorides of said polycarboxylic acids, said amino acids being present in the proportion of 250 to 2500 molecules for each molecule of polycarboxylic acid.

5. A method of preparing polyamide condensation polymers which comprises condensing a compound of the group consisting of amino acids having a single reactive amino group and a single carboxylic acid group, said groups being separated by more than four atoms and said amino acids being free from other reactive substituents, and the corresponding esters, amides, and lactams of said amino acids, with a compound of the group consisting of monomeric polycarboxylic acids having from six to twelve carboxylic acid groups and being free from other reactive substituents, and the corresponding esters, amides, and acid chlorides of said polycarboxylic acids, said amino acids being present in the proportion of 20 to 1000 molecules for each carboxylic acid group of a polycarboxylic acid molecule.

6. A method of preparing polyamide condensation polymers which comprises condensing a compound of the group consisting of amino acids having a single reactive amino group and a single carboxylic acid group, said groups being separated by more than four atoms and said amino acids being free from other reactive substituents, and the corresponding esters, amides, and lactams of said amino acids, with a compound of the group consisting of monomeric polycarboxylic acids having from six to twelve carboxylic acid groups and being free from other reactive substituents, and the corresponding esters, amides, and acid chlorides of said polycarboxylic acids, said amino acids being present in the proportion of 30 to 200 molecules for each carboxylic acid group of a polycarboxylic acid molecule.

7. A method of preparing polyamide condensation polymers which comprises condensing a compound of the group consisting of amino acids having a single reactive amino group and a single carboxylic acid group, said groups being separated by more than four atoms and said amino acids being free from other reactive substituents, and the corresponding esters, amides, and lactams of said amino acids, with a compound of the group consisting of monomeric polycarboxylic acids having from six to twelve carboxylic acid groups and being free from other reactive substituents, and the corresponding esters, amides, and acid chlorides of said polycarboxylic acids, said polyamides being composed of polyamide molecules a preponderance of which exceed 40,000 in molecular weight.

8. A method of preparing polyamide condensation polymers which comprises condensing a compound of the group consisting of amino acids having a single reactive amino group and a single carboxylic acid group, said groups being separated by more than four atoms and said amino acids being free from other reactive substituents, and the corresponding esters, amides, and lactams of said amino acids, with a compound of the group consisting of monomeric polycarboxylic acids having from six to twelve carboxylic acid groups and being free from other reactive substituents, and the corresponding esters, amides, and acid chlorides of said polycarboxylic acids, said polyamides being composed of polyamide molecules a preponderance of which exceed 10,000 in molecular weight.

9. The polyamide condensation polymers prepared by condensing a compound of the group consisting of amino acids having a single reactive amino group and a single carboxylic acid group, said groups being separated by more than four atoms and said amino acids being free from other reactive substituents, and the corresponding esters, amides, and lactams of said amino acids, with a compound of the group consisting of monomeric polycarboxylic acids having from six to twelve carboxylic acid groups and being free from other reactive substituents, and the corresponding esters, amides, and acid chlorides of said polycarboxylic acids, said polyamides being composed of polyamide molecules a preponderance of which exceed 40,000 in molecular weight.

10. The polyamide condensation polymers prepared by condensing a compound of the group consisting of amino acids having a single reactive amino group and a single carboxylic acid group, said groups being separated by more than four atoms and said amino acids being free from other reactive substituents, and the corresponding esters, amides, and lactams of said amino acids, with a compound of the group consisting of monomeric carboxylic acids having from six to twelve carboxylic acid groups and being free from other reactive substituents, and the corresponding esters, amides, and acid chlorides of said polycarboxylic acids, said polyamides being composed of polyamide molecules a preponderance of which exceed 10,000 in molecular weight.

11. A method of preparing a polyamide condensation polymer which comprises condensing epsilon-caprolactam and 3,3,5,5,3',3',5',5'-octa-(2-carboxyethyl) 4,4'-diketodicyclohexyl, said epsilon-caprolactam being present in the proportion of 100 to 5000 molecules for each molecule of the octabasic acid.

12. The polyamide condensation polymer prepared by condensing epsilon-caprolactam and 3,3,5,5,3',3',5',5'-octa-(2-carboxyethyl) 4,4'-diketodicyclohexyl, said epsilon-caprolactam being present in the proportion of 100 to 5000 molecules for each molecule of the octabasic acid.

13. A method of preparing a polyamide condensation polymer which comprises condensing 10-aminodecanoic acid and 3,3,5,5,3',3',5',5'-octa-(2-carboxyethyl) 4,4'-diketodicyclohexyl, said aminodecanoic acid being present in the proportion of 100 to 5000 molecules for each molecule of the octabasic acid.

14. The polyamide condensation polymer prepared by condensing 10-aminodecanoic acid and 3,3,5,5,3',3',5',5'-octa-(2-carboxyethyl) 4,4'-diketodicyclohexyl, said aminodecanoic acid being present in the proportion of 100 to 5000 molecules for each molecule of the octabasic acid.

15. A method of preparing a polyamide condensation polymer which comprises condensing 1,1,2,3,4,5-hexa(2'-carboxyethyl) cyclopentadiene and epsilon-caprolactam, said epsilon-caprolactam being present in the proportion of 100 to 5000 molecules for each molecule of the acid.

16. The polyamide condensation polymer prepared by condensing 1,1,2,3,4,5-hexa(2'-carboxyethyl) cyclopentadiene and epsilon-caprolactam, said epsilon-caprolactam being present in the proportion of 100 to 5000 molecules for each molecule of the acid.

PAUL J. FLORY.

(References on following page)

REFERENCES CITED

The following references are of record in the file of this patent:

UNITED STATES PATENTS

| Number | Name | Date |
|---|---|---|
| 2,241,321 | Schlack | May 6, 1941 |
| 2,303,177 | Schlack | Nov. 24, 1942 |
| 2,304,687 | Hagedorn | Dec. 8, 1942 |
| 2,341,611 | Hagedorn | Feb. 15, 1944 |

OTHER REFERENCES

Ser. No. 389,002, Hopff et al. (A. P. C.), published Apr. 20, 1943.